(12) United States Patent
Schalk et al.

(10) Patent No.: US 7,966,265 B2
(45) Date of Patent: Jun. 21, 2011

(54) MULTI-MODAL AUTOMATION FOR HUMAN INTERACTIVE SKILL ASSESSMENT

(75) Inventors: Thomas Barton Schalk, Plano, TX (US); Jimmy Lee Stovall, Colleyville, TX (US); Walter Phillip Brooks, Plano, TX (US)

(73) Assignee: ATX Group, Inc., Irving, TX (US)

( * ) Notice: Subject to any disclaimer, the term of this patent is extended or adjusted under 35 U.S.C. 154(b) by 119 days.

(21) Appl. No.: 12/116,433

(22) Filed: May 7, 2008

(65) Prior Publication Data
US 2008/0281620 A1    Nov. 13, 2008

Related U.S. Application Data

(60) Provisional application No. 60/928,895, filed on May 11, 2007.

(51) Int. Cl.
*G06Q 10/00* (2006.01)
(52) U.S. Cl. .................. 705/321; 705/320; 705/319
(58) Field of Classification Search .................. None
See application file for complete search history.

(56) References Cited

U.S. PATENT DOCUMENTS

| | | | | |
|---|---|---|---|---|
| 5,594,791 A * | 1/1997 | Szlam et al. | ............ | 379/265.09 |
| 6,021,428 A * | 2/2000 | Miloslavsky | ................ | 709/206 |
| 6,029,124 A * | 2/2000 | Gillick et al. | ................. | 704/200 |
| 6,038,544 A * | 3/2000 | Machin et al. | .................. | 705/11 |
| 6,175,564 B1 * | 1/2001 | Miloslavsky et al. | ......... | 370/352 |
| 6,311,164 B1 * | 10/2001 | Ogden | ............................. | 705/7 |
| 6,687,877 B1 * | 2/2004 | Sastry et al. | .................. | 715/201 |
| 6,847,714 B2 * | 1/2005 | Das et al. | ................. | 379/265.12 |
| 6,978,006 B1 * | 12/2005 | Polcyn | ...................... | 379/265.12 |
| 7,349,843 B1 * | 3/2008 | Beck | .............................. | 704/231 |
| 2001/0049688 A1 * | 12/2001 | Fratkina et al. | ............ | 707/104.1 |
| 2004/0096050 A1 * | 5/2004 | Das et al. | .................. | 379/265.12 |
| 2004/0117185 A1 * | 6/2004 | Scarano et al. | ............... | 704/254 |
| 2005/0060175 A1 * | 3/2005 | Farber et al. | ..................... | 705/1 |
| 2005/0114379 A1 * | 5/2005 | Lee | ................ | 707/102 |
| 2005/0171792 A1 * | 8/2005 | Lin et al. | .......................... | 705/1 |
| 2005/0286707 A1 * | 12/2005 | Erhart et al. | ............. | 379/265.07 |
| 2006/0262920 A1 * | 11/2006 | Conway et al. | ........... | 379/265.02 |
| 2008/0215976 A1 * | 9/2008 | Bierner et al. | ................. | 715/708 |
| 2009/0164292 A1 * | 6/2009 | Omiya | .............................. | 705/9 |
| 2009/0187414 A1 * | 7/2009 | Haskins et al. | .................... | 705/1 |

OTHER PUBLICATIONS

"Recognition Confidence Scoring for use in speech understanding systems"; Hazen etal; 2000.*

* cited by examiner

*Primary Examiner* — Traci L Casler
(74) *Attorney, Agent, or Firm* — Mayback & Hoffman, P.A.; Gregory L. Mayback; Rebecca A. Tie (57) ABSTRACT

A method for screening applicants includes remotely accessing a screening entity's web page by a potential candidate. The candidate is asked, via the pre-screening web page, to input responses to a set of queries tailored to the screening entity and the candidate's responses to the queries are stored. A phone call is automatically initiated to the candidate in response to at least one of the candidate's responses. An interactive information gathering process is started with the candidate using both the telephone and the computer. In the process, audio prompts to the candidate are generated via the telephone and the candidate's verbal responses are recorded via the telephone. A profile of the candidate is stored in a database including the verbal responses from the candidate for later access and analysis by the screening entity. The recorded responses are analyzed by the screening entity to make quality judgments about the candidate.

28 Claims, 4 Drawing Sheets

---

When you are ready to begin speaking, press one.

The SOS button connects customers to a service provider's response center. Press it to request emergency services. The wrench button directly connects customers to a service provider's roadside assistance response center. The i-button connects customers to a service provider's response center. Press the i-button to complete an acquaintance call, request traffic, route assistance or concierge services. Remember, to enjoy the benefit of these services, all customers must complete a subscriber agreement and maintain an active account.

When you have finished, press two.

Exercise 3

Answer the questions over the telephone.

Exercise 4

Describe a delightful customer service experience in less than 2 minutes. Press one on your telephone keypad to begin. Press two when finished.

When you are ready to begin speaking, press one.

The SOS button connects customers to a service provider's response center. Press it to request emergency services. The wrench button directly connects customers to a service provider's roadside assistance response center. The i-button connects customers to a service provider's response center. Press the i-button to complete an acquaintance call, request traffic, route assistance or concierge services. Remember, to enjoy the benefit of these services, all customers must complete a subscriber agreement and maintain an active account.

When you have finished, press two.

Exercise 3

Answer the questions over the telephone.

Exercise 4

Describe a delightful customer service experience in less than 2 minutes. Press one on your telephone keypad to begin. Press two when finished.

MULTI-MODAL AUTOMATION FOR HUMAN INTERACTIVE SKILL ASSESSMENT

CROSS-REFERENCE TO RELATED APPLICATION

This application claims the priority, under 35 U.S.C. §119, of U.S. Provisional Patent Application No. 60/928,895 filed May 11, 2007, the entire disclosure of which is hereby incorporated herein by reference in its entirety.

STATEMENT REGARDING FEDERALLY SPONSORED RESEARCH OR DEVELOPMENT n/a

FIELD OF THE INVENTION

The present invention lies in the field of off-site customer support, in particular, in the field of identifying qualified human agents for providing enhanced customer support. The method can be used, particularly, as a tool to assist in separating hirable agents from unhirable agents.

BACKGROUND OF THE INVENTION

Customer-support centers rely on trained human agents who possess skills that are suited for the type of service that is being delivered. There are several skill requirements that are common across call centers. One example of such desirable skills is good speech intelligibility, for a specific language, when speaking over a telephone to a customer. Another desirable skill is the ability to interact with web tools that utilize screen monitors, keyboards, and other control devices. For customers receiving assistance over the telephone, an ideal experience can be delivered by a human agent that speaks the language well, performs the proper tasks, delivers the right information, and sounds delightful while serving the customer in a timely manner.

In the context of identifying qualified human agents, it is desirable to find efficient methods for measuring one's ability to combine speaking skills and web interaction to produce good customer experience during telephone support scenarios. It is also desirable to find efficient methods for assessing a person's creativity and ability to express that creativity verbally. It is particularly desirable to find efficient ways to predict that one will deliver delightful experiences to customers seeking assistance. It is further desirable to determine if an agent has aptitude in certain areas of specialization.

BRIEF SUMMARY OF THE INVENTION

The invention provides multi-modal automation for human interactive skill assessment that overcomes the herein-mentioned disadvantages of the heretofore-known devices and methods of this general type and that, in the context of identifying qualified human agents, measures one's ability to combine speaking skills and web interaction to produce a positive customer experience during telephone support scenarios, assesses a person's creativity and ability to express that creativity verbally, predicts who is able to deliver delightful experiences to customers seeking assistance, and determines if that agent has aptitude in certain areas of specialization.

The present invention does so by helping automate the identification of human agents possessing these qualities.

The present inventive process can automatically pre-screen call center applicants based on pre-defined speech tasks. The application is multimodal and requires simultaneous telephone and Internet web page access by the applicants. There are critical benefits that become realized when telephone interaction is coupled with visual information provided through web access. In particular, applicants can read web-based scripted information into the telephone handset. The telephone speech can be recorded and analyzed in a variety of ways, including subjective human assessment and automated assessment provided by a speech recognizer. Figures, pictures, or any other form of graphics can also provide the basis for a speech task. For example, a map with a highlighted route could be displayed on a web page and the speech task for the interviewee could include speaking driving directions over the telephone. Individual driving instructions would need to be accurate ("head east on" instead of "head west on") and the street names would need to be pronounced correctly.

The present invention is an automated screening application that identifies speech clarity, basic thought process, and experience. The invention accomplishes tasks normally performed by call center recruiters or supervisors of call center personnel and, thereby reduces the work load and/or personnel for interviewing potential candidates—employees who are, typically, highly compensated (at least when compared to the potential candidates).

The present invention has the many valuable characteristics not present by any previous automated method for interviewing qualified candidates, including, for example:
 1. Highly customizable
 2. Highly automated
 3. Highly efficient
 4. Universal access, any language
 5. Content flexibility
 6. Adjustable acceptance criteria
 7. Remote access, any location The inventive process is highly customizable and can be optimized for almost any customer service environment. Examples of customer service environments include computer technical support, concierges, airline reservations, utilities, telemarketing, car rentals, vacation planning, roadside assistance, and home security. The type of dialogue that is recorded can be directly correlated to the line of business. In a later discussion, examples will serve to illustrate the various types of dialogue that are recorded.

The application is highly automated and consumes a minimum amount of applicant time and analysis time by human resource personnel. Using multi-modal automation, speech tasks, closely tied to audio and visual cues, are recorded and analyzed to evaluate candidates. Although the examples provided in this document are in English, the application can be made available in any language and in various combinations of languages where such skills are also being evaluated.

Because the inventive process is automated and available electronically, e.g., over the Internet, the program is accessible by applicants at any time, and from any location, as long as Internet and telephone access exist. There is no scheduling required and the application can run stand alone without human supervision. From the human resources side, applicant data can be reviewed at any time after being stored and can be configured to only require appropriate World Wide Web access including the ability to listen to recorded audio, e.g., through an audio wave file player.

With the foregoing and other objects in view, there is provided, in accordance with the invention, a method for screening applicants by a screening entity, including the steps of remotely accessing a screening entity's pre-screening web page over the Internet by a potential candidate using an Internet-accessible computer available to the candidate, requesting the candidate, via the pre-screening web page and the computer, to input responses to a set of queries tailored to the screening entity and storing the candidate's responses to the queries, at least during the response requesting step, automatically initiating a phone call to the candidate over a telephone on a telephone network in response to at least one of the candidate's responses, commencing an interactive information gathering process with the candidate using both the telephone and the computer by generating audio prompts to the candidate via the telephone and recording the candidate's verbal responses via the telephone, storing a profile of the candidate in a database including the verbal responses from the candidate for later access and analysis by the screening entity, and analyzing the recorded responses by the screening entity to make quality judgments about the candidate.

In accordance with another mode of the invention, there are also provided the steps of hosting the web page with external server and accessing an internal server that hosts an internal web page of the screening entity.

In accordance with a further mode of the invention, the phone call initiating step can be carried out by simultaneously initiating the phone call to the candidate or by initiating the phone call to the candidate after the candidate has completed responding to the queries.

In accordance with an added mode of the invention, the phone call to the candidate is initiated with a voice server through a private branch exchange over the telephone network.

In accordance with an additional mode of the invention, the candidate's identity is confirmed through a set of identification questions and responses via one of the telephone and the pre-screening web page.

In accordance with yet another mode of the invention, the profile storing step is carried out by storing the profile of the candidate during the information gathering process and/or after the information gathering process is complete.

In accordance with yet a further mode of the invention, the profile storing step is carried out by storing the profile of the candidate through an entity-secure intranet link.

In accordance with yet an added mode of the invention, the phone call initiating step is carried out by initiating the phone call only with outbound calls from the screening entity to, thereby, control access to the information gathering process.

In accordance with yet an additional mode of the invention, the information gathering step is carried out by controlling a number and kind of questions presented to the candidate to simulate a real call-center seat.

In accordance with again another mode of the invention, the storing step is carried out selectively and/or continually.

In accordance with again a further mode of the invention, the analyzing step is carries out with automation by automatically determining a confidence scoring of the candidate with a computerized speech recognition device programmed to parse a particular response into individual words and to either compare the parsed response to a desired responses or to transcribe the parsed response for later use and access by the screening entity.

In accordance with again an added mode of the invention, the automated confidence scoring step is carried out by judging at least an accuracy and an intelligibility of the candidate's speech utilizing a target phrase represented in a speech recognition grammar.

With the objects of the invention in view, there is also provided a method for screening candidates by a screening entity, includes the steps of initiating a job application procedure by having an candidate connect to a secured web page of a screening entity, querying the candidate to enter candidate-specific personal identification data and securely confirming the identification data, and initiating a phone call to the candidate after the identification data is confirmed. While the candidate is still communicating with the web page and, during the phone call, at least one of a set of exercises is carried out. For example, a voice quality exercise is initiated over the telephone by asking the candidate to repeat spoken phrases over the telephone, recording the candidate's speech for each phrase for subsequent off-line analysis, and automatically scoring each recorded phrase with a confidence level correlated with how well the recorded phrase matches an expected pronunciation. Also, a dictation clarity exercise is initiated by instructing candidate to read a script sent to a particular web page viewable by the candidate and, when finished, recording speech from the candidate for subsequent off-line analysis and applying a confidence scoring to the recorded speech. A question-answer exercise is initiated by transmitting specific multiple-choice questions over the telephone, prompting the candidate to answer each question after it is presented, recording the candidate's speech for each answer, and automatically scoring each recorded answer with a confidence level correlated to how well the recorded phrase matches an expected pronunciation. A service knowledge exercise is initiated to determine the candidate's ability to comprehend an example of good customer service is and whether the candidate can intelligently describe such an experience by having the candidate give a speech regarding such an experience, recording the speech for subsequent off-line analysis, and applying a subjective confidence scoring to the recorded speech. A graphic comprehension exercise is initiated to screen the candidate's ability to respond to a provided graphic by displaying a graphic to the candidate, requiring the candidate to answer questions regarding the graphic, recording the spoken answers over the telephone, and automatically scoring each answer with a confidence level correlated with how well the recorded phrase matches the expected pronunciation. A speaking satisfaction exercise is initiated with the candidate to evaluate the kind of experience that a potential customer will have after speaking to the candidate by giving the candidate a random one of a series of predefined situations in which candidate is required to role-play an operator answering in real-time a call from a virtual customer, recording the conversation between the candidate and the virtual customer for subsequent off-line analysis, and applying a subjective confidence scoring to the recorded conversation. After at least one of the exercises is complete, the screening entity stores data recorded for later analysis and informs the candidate that an application process is complete.

In accordance with again an additional mode of the invention, the identification data is securely confirmed.

In accordance with still another mode of the invention, the secure confirming step is carried out by one of directly with the candidate and indirectly through a response-requiring email sent to the candidate's email address.

In accordance with still a further mode of the invention, the phone call initiating step is carried out with a voice server immediately after the identification data is confirmed.

In accordance with still an added mode of the invention, the voice quality initiating exercise step is carried out by storing the candidate's speech for each phrase for off-line analysis.

In accordance with still an additional mode of the invention, the dictation clarity exercise step is carried out by storing speech from the candidate for subsequent off-line analysis.

In accordance with another mode of the invention, the confidence scoring step is carried out at least one of automatically and with human judgment.

In accordance with a further mode of the invention, the question-answer exercise step is carried out by storing the candidate's speech for each question for subsequent off-line analysis.

In accordance with an added mode of the invention, the question-answer exercise step is carried out by transmitting the multiple-choice questions by at least one of a human voice and a machine voice.

In accordance with an additional mode of the invention, the service knowledge exercise step is carried out by storing the speech for subsequent off-line analysis. In accordance with yet another mode of the invention, the graphic comprehension exercise step is carried out by storing the spoken answers for subsequent off-line analysis.

In accordance with yet a further mode of the invention, the graphic comprehension exercise step is carried out by providing a map as the graphic and screening the candidate's ability to give driving directions.

In accordance with yet an added mode of the invention, the speaking satisfaction exercise step is carried out by storing the conversation for subsequent off-line analysis.

In accordance with yet an additional mode of the invention, the candidate is provided with a timeframe for hearing from the screening entity or given a call number and a date for checking on the candidate's application.

In accordance with a concomitant mode of the invention, the candidate is provided with a call number and a date for checking on a status of the application.

Other features that are considered as characteristic for the invention are set forth in the appended claims.

Although the invention is illustrated and described herein as embodied in multi-modal automation for human interactive skill assessment, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

Advantages of embodiments of the present invention will be apparent from the following detailed description of the preferred embodiments thereof, which description should be considered in conjunction with the accompanying drawings in which.

DETAILED DESCRIPTION OF THE PREFERRED EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. It must be noted that, as used in the specification and the appended claims, the singular forms "a," "an," and "the" include plural references unless the context clearly dictates otherwise.

While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Figure 1:
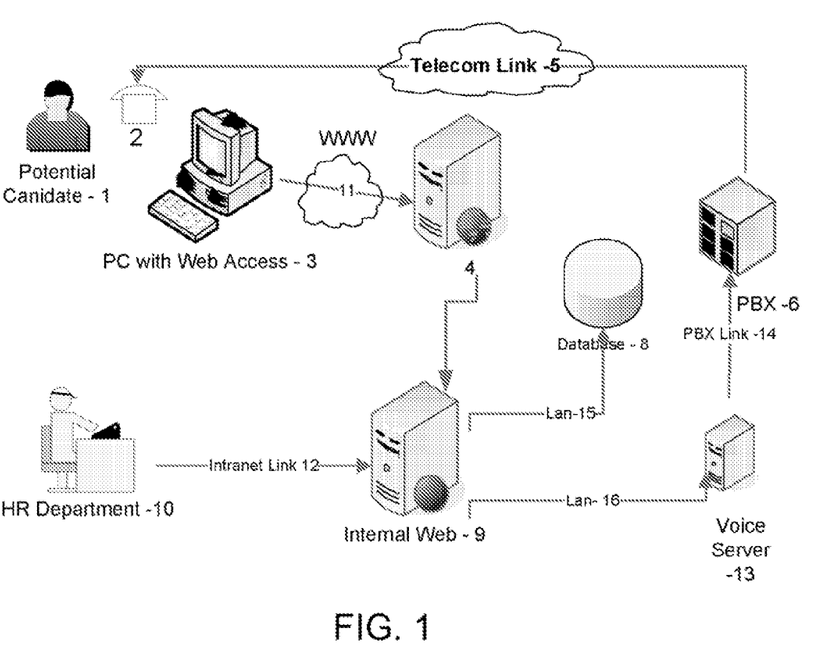
FIG. 1 is a block diagram of high-level components of an exemplary system architecture for carrying out the method according to the invention.

Referring now to the figures of the drawings in detail and first, particularly to FIG. 1 thereof, there is shown an illustration of high-level components of an exemplary system architecture for carrying out the present invention. During an applicant screening process, a potential candidate 1, by operating a computer 3, accesses a link through the Internet 11, also known as the "World Wide Web," to a server 4 that hosts an external web page. From the external web page hosted by the external server 4, an internal server 9 that hosts a web site internal to the applicant screening entity 10 is accessed. The pre-screening web site in the internal server 9 requests the applicant 1 to input responses to various queries tailored to the screening entity 10. The responses are stored for later use or, as a course of record keeping, in a database 8, for example.

Either simultaneously or thereafter, the candidate 1 is called on a telephone 2 through a private branch exchange ("PBX") 6 over a telephone network 5. A voice server 13 initiates this call 14 to the applicant 1 automatically in response to the candidate's response. The candidate's identity can be confirmed (or not) through a set of identification questions and responses. After confirmation, an interactive process begins with the potential candidate 1. The process includes both the telephone 2 and the computer 3 having access to the Internet 11. The voice server 13 generates audio prompts to the candidate 1 and records the applicant's verbal responses. After the candidate 1 completes the exercises, a profile is stored in a database 8 for later access and analyzing by the Human Resource Department of the screening entity 10, for example, via access through an entity-secure intranet link 12. The analysis of the recorded responses assists the screening entity 10 to make quality judgments about the candidate 1.

As with other Human Resource issues, it is desirable to control access to this screening process. Internet security can be applied to applicant's access to the external server 4, and an outbound calling strategy also can control access to the screening process. During the applicant screening process, control of the number and kind of questions presented on the applicant's computer 3 and of the phone calls made to the applicant's phone 2 screens the applicant's 1 individual ability to follow instructions and to interact in a multi-modal environment, which simulates a real call-center seat. Speech is recorded selectively throughout the process (or continually) and is stored for subsequent evaluation. It is important, to every extent possible, to automate the evaluation using a confidence scoring produced by a speech recognition device, in other words, with a sufficiently sophisticated speech-recognition process, the responses can be parsed into individual words and compared to desired responses or transcribed for later use and fast access by the entity's evaluation staff. As phrases are pronounced, the voice server 13, which is able to recognize speech, judges at least two characteristics of the applicant's speech: accuracy and intelligibility. This automated confidence scoring quantitatively measures pronunciation quality, for example, for a target phrase that is represented in a speech recognition grammar.

Figure 2:
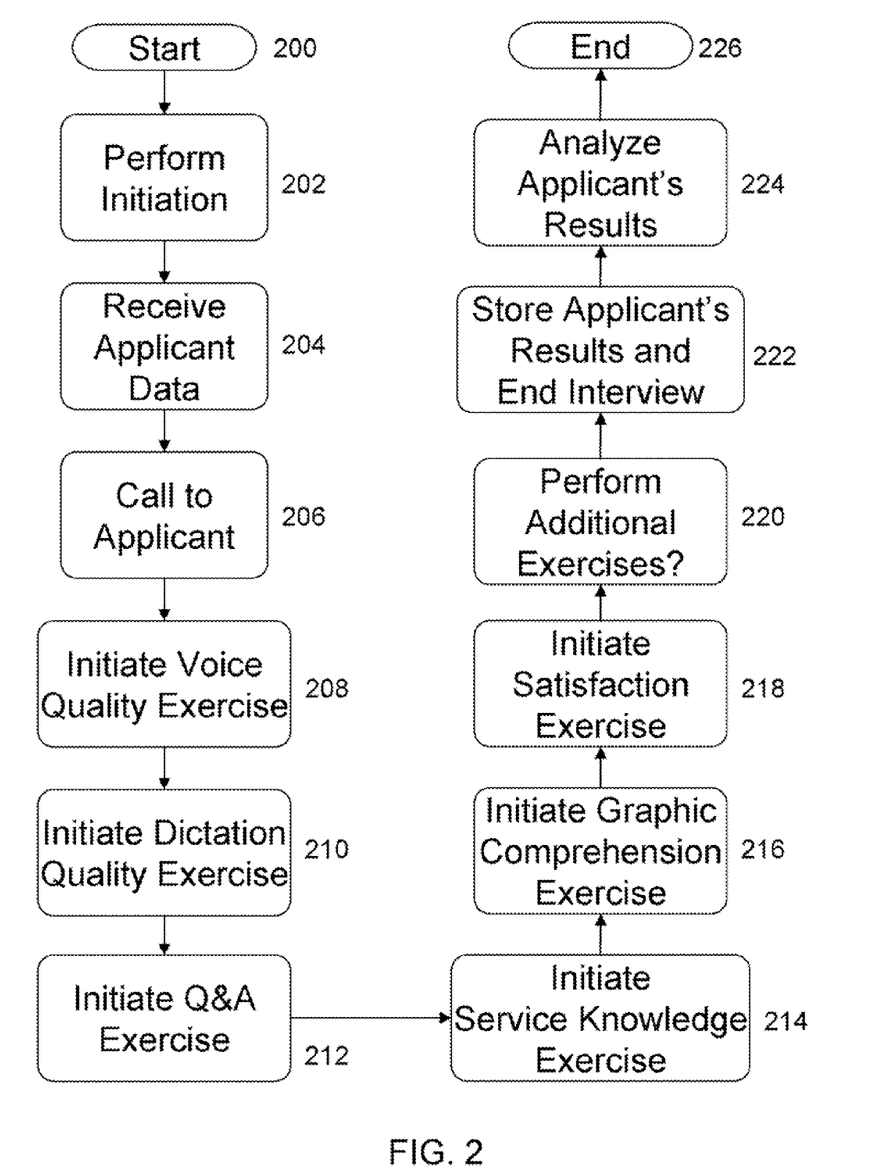
FIG. 2 is a process flow diagram of one exemplary process for carrying out the method according to the invention.
Figure 3:
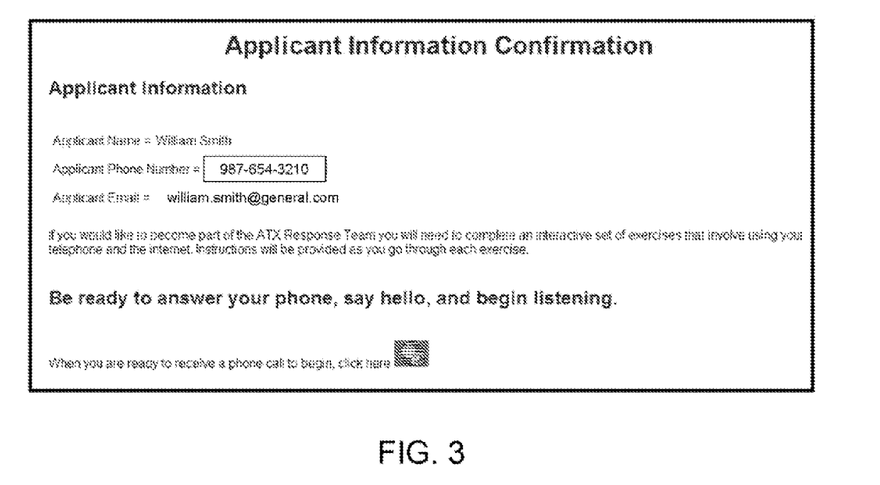
FIG. 3 is a diagrammatic representation of an exemplary web interface for receiving applicant information in the method according to the invention.

An exemplary applicant evaluation process is explained below with reference to the process flow chart of FIG. 2 illustrating one exemplary embodiment of the present invention. The flow starts at step 200 and moves directly to step 202 where the applicant 1 connects to a secured web page and initiates the application procedure. As part of the initiation, applicant 1 can, for example, read an overview, accept terms of use, and select a <continue> option to advance to the next step in the procedure. In step 204, the applicant enters their personal identification data, for example, name, address, email address, and/or current telephone number. It is noted that this data can be confirmed directly or indirectly through a response-requiring email sent to the applicant's email address. An exemplary web-provided screen for receiving this information is illustrated in FIG. 3.

In step 206, the voice server 13 immediately initiates a phone call to applicant 1, while applicant 1 is still logged on to the web application. In step 208, a voice quality exercise is initiated. The applicant 1 is asked to repeat spoken phrases over his/her telephone 2. More specifically, specific phrases of a human or machine voice are transmitted over the phone line to applicant 1 and applicant 1 repeats these phrases/words shortly after each phrase is played. For each phrase, the applicant's speech is recorded and end-pointed for off-line analysis. Each recorded phrase is automatically scored with a confidence level that is correlated with how well the recorded phrase matches the expected pronunciation, as represented in a speech recognition grammar with highly tuned pronunciation lexicons. With such voice recognition grammar, strong accents and mispronunciations, for example, will map into low-confidence scores. Conversely, clearly spoken words with proper inflections and pronunciations will map into high-confidence scores.

In step 210, a dictation clarity exercise is carried out. To start this exercise, the applicant 1 can be instructed to continue by either selecting specific web link buttons (visual) or by pressing keys on the telephone keypad. To detect clarity of dictation, applicant 1 is required to read a script, which is sent to a particular web page viewable by the applicant 1. The applicant 1 can be given time to read and study the script before speaking the script into the telephone 2. To allow for this study time (which can be limited if desired by the screening entity), the applicant 1 will press a key on the telephone keypad (a web button can also be used with the appropriate architecture) and then dictate the provided script. Upon completion, the applicant 1 can be asked to press a telephone key or web button. Speech from the applicant is stored for subsequent offline processing. Although confidence scoring can be applied, additional human judgment can by used because tone, volume and other acoustical characteristics are more subjective than objective and, possibly, can be best analyzed by a trained employee. In this way, the employee can score any and all aspects of how well the script was spoken by the applicant 1.

Figure 4:
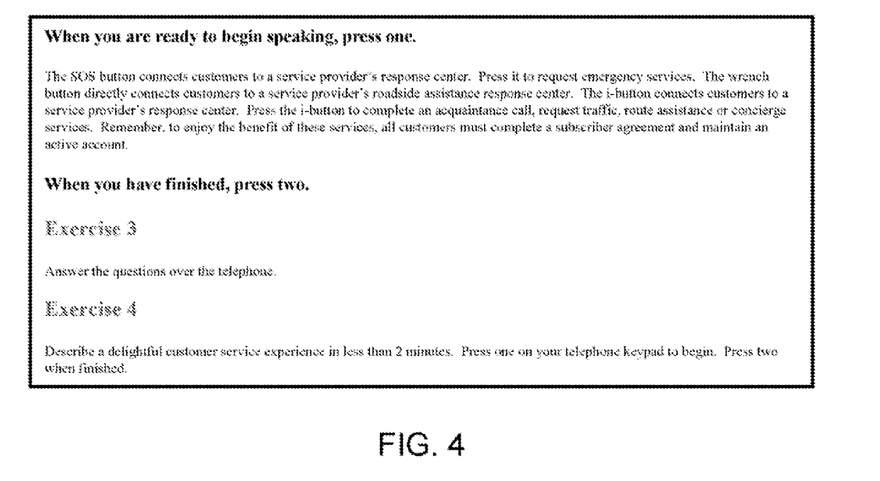
FIG. 4 is a diagrammatic representation of an exemplary web interface for carrying out verbal-applicant-screening exercises in the method according to the invention.

In step 212, a question-answer exercise is initiated. Reference is made to "Exercise 3" in FIG. 4, which is a sample instruction to an applicant 1. Specific multiple-choice questions are transmitted over the telephone 2 by a human or machine voice and the applicant 1 is prompted to answer each question after it occurs. For each answer, the applicant's speech is recorded and is end-pointed for off-line analysis. Each recorded phrase is automatically scored with a confidence level that is correlated to how well the recorded phrase matches the expected pronunciation, as represented in a speech recognition grammar with highly tuned pronunciation lexicons. As set forth above, strong accents and mispronunciations map into low confidence scores. If an incorrect answer is spoken, a pre-defined low confidence score will most likely be assigned. Alternatively, if a correct answer is spoken, a pre-defined high confidence score will most likely be assigned.

In step 214, a service knowledge exercise is initiated. This speaking exercise is aimed at discovering whether the applicant 1 can understand what good customer service is and whether he/she can intelligently describe such an experience. More specifically, as show in "Exercise 4" in FIG. 4, the applicant 1 is asked, for instance, to describe a delightful service that he/she has experienced. The applicant is allowed time to think of the experience and how he/she would like to describe the experience to the screening entity within a certain time limit (such as 2 minutes). It should be noted that any questions can be presented to the applicant 1 for the purpose of screening the applicant's ability to speak and respond and the present invention is not limited to only those questions related to customer-support experiences. The applicant 1, then, speaks over the telephone (or Internet) after pressing a key, for example, on the telephone keypad (a web button can also be used). Upon completion, the applicant 1 indicates that he/she is finished by pressing a telephone key or web button. The speech presented by the applicant can be stored for subsequent off-line processing. Although confidence scoring can be applied to the spoken words and sentences, here, human judgment can be given greater weight because the content of the speech will not be known ahead of time. In particular, human judgment can be used to evaluate the applicant's persona and how well the applicant's voice will sound to a customer. Additionally, human judgment can be used to score the applicant's grammar, intonation, and general talent in the area of servicing customers. Thus, human subjectivity is well suited for scoring the content and quality of what was spoken.

In step 216, a graphic comprehension exercise is initiated. This exercise screens the applicant's ability to respond to a provided graphic. For example, an image, representing the evaluation material, is displayed on a web page that is visible to the applicant 1. Instead of reading a script, repeating a phrase, answering a spoken question, or describing an experience, the applicant 1 is required to deduce answers to questions from the provided image and to speak their answers over the telephone upon being prompted to do so. For each answer, the applicant's speech is recorded and is end-pointed for off-line analysis. Each recorded phrase is automatically scored with a confidence level that is correlated with how well the recorded phrase matches the expected pronunciation, for instance, as represented in a speech recognition grammar with highly tuned pronunciation lexicons. As before, strong accents and mispronunciations map into low confidence scores. In this exercise, a word spoken incorrectly significantly reduces the confidence score, which may be even further reduced when other confidence-lowering factors are present, such as improper microphone placement, for example.

Figure 5:
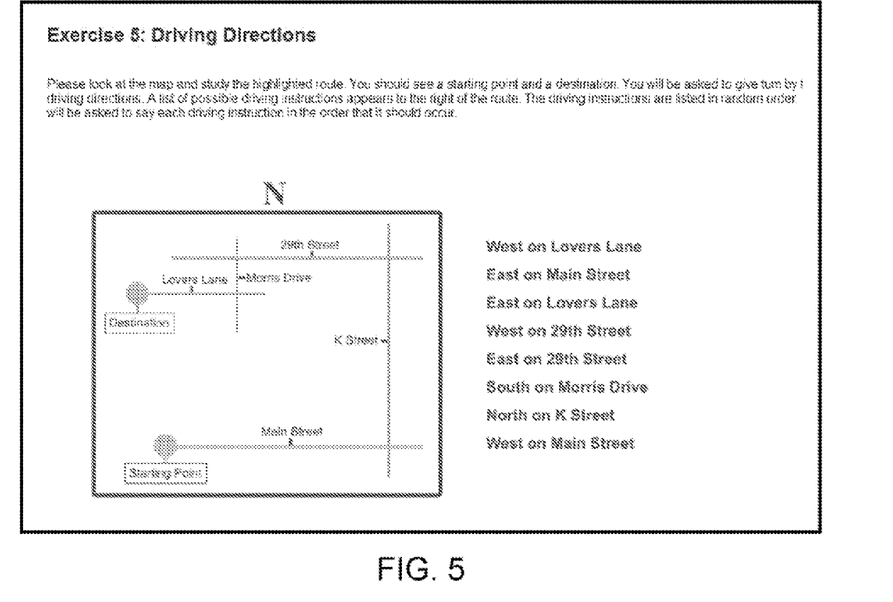
FIG. 5 is a diagrammatic representation of an exemplary web interface for carrying out graphic-applicant-screening exercises in the method according to the invention.

An exemplary graphic comprehension exercise is illustrated as "Exercise 5" in FIG. 5. This example screens an applicant's ability to give driving directions. The map graphic is displayed to the applicant 1. The applicant 1 is asked to give turn-by-turn driving directions and, if desired, a list of possible driving instructions. These instructions can be listed in random order (as shown) or they can be listed in order from start to destination (however, this latter approach removes the deductive reasoning and cartographic analyses that can be performed with this exercise). In the most difficult case, the applicant 1 will not be provided with instructions and will be asked to guide a virtual driver from the starting point to the destination.

In step 218, a speaking satisfaction exercise is initiated. This speaking exercise is aimed at determining the kind of experience that a customer will have after speaking to the applicant 1 (such as delight, satisfied, displeasure, horror), the experience type can be referred to as a "pleasantry factor." The applicant is given one of a series of random situations in which they will be required to role-play an operator answering a call from a driver (random and/or coordinated selection is desired where an applicant 2 can enter the application process more than once and it is insured that a different scenario is role-played every subsequent time). It is desirable to not give the applicant 1 time to think and prepare because a "real-time" operator assistance experience is the desired output. The applicant 1 can be allowed to listen to a driver, for example, one who has just witnessed an accident, who has been involved in an accident, who has locked their child in a car, and many other scenarios, and then be asked to counsel and assist the driver. The conversation between the applicant 1 and the virtual driver is stored for subsequent off-line processing. Like step 216, only limited automatic confidence scoring can be applied to show use of grammar and pronunciation, for example. In this case, subjective human judgment is most important to score how well the potential operator dealt with the supplied situation.

Any number of other kinds of additional exercises can be performed as desired in step 220. Once all exercises are complete, the applicant 1 is informed that the application process is done and the data is ready for analysis. If desired, the applicant 1 can be given a timeframe for hearing from the screening entity or given a call number and a date for checking on his/her application. The above exercises are all not necessary or required. These exercises can occur in any order and in any combination, some of which can be eliminated if desired.

The process of the present invention now allows HR personnel 10 to review applicant's stored data 8, step 224, at any time, whether through a web access 9 or after it has been stored internally, in step 222, at the screening entity's selected data storage location. The process ends at step 226.

Many different screening entities can be allowed to access their own or any other entity's screening data. For example, where an applicant is determined to be less suitable for one kind of employment opportunity, that person's performance may be suitable for another opportunity and having the data available may be beneficial if different entities agree to share the screening exercises and recorded results. As such, an administrative web page 9 can be accessed from an intranet link 12 or from any resource connected to the Internet 11, provided that sufficient and/or desired security requirements are met. In order to review the recorded data, measures for playing recorded audio, such as audio wave files, to the human resources [or else define it] personnel 10 are needed.

Figure 6:
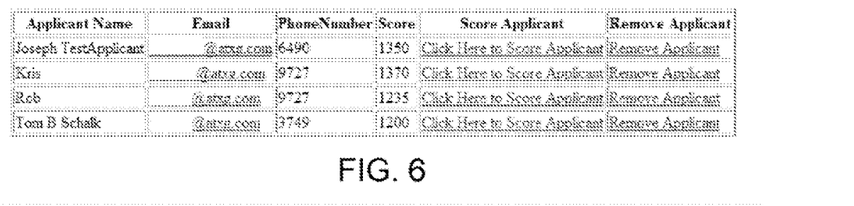
FIG. 6 is a list of an exemplary output queue of applicants to be reviewed by screening entities in the method according to the invention.

After an applicant 1 completes the set of exercises, an audio profile (e.g., a web page audio profile) is automatically created, specific to that applicant 1. For automated and first-in-first-out processing of all applications received by the screening entity, applicant-specific identification data can be placed into a queue, as illustrated in FIG. 6, for example, for convenient access and processing by human resources personnel, such as over the World Wide Web. To access data regarding a specific applicant 1, a "score applicant" link can be selected. Phone numbers in FIG. 6 can be 4-digit internal extensions as well as 10-digit external phone numbers.

Figure 7:
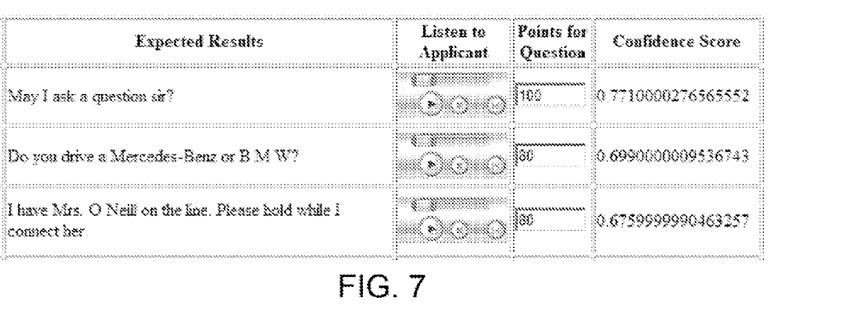
FIG. 7 is a diagrammatic representation of an exemplary web interface for reviewing an applicant's screening results in the method according to the invention.

Upon selecting a specific applicant 1 from the queue, any information can be displayed. For example, a task description, corresponding recorded audio data, and corresponding confidence scoring 13 can be displayed for each of the exercises. For each task within an exercise, wave files (for example) are available for listening by the reviewing agent. Displayed with the wave files are associated confidence scores that range from 0.9999 to 0.0000, with the higher confidence score indicating that the pronunciation is more likely correct than not. In addition to automated scoring with confidence measures, the reviewing agent can subjectively score each wave file on a scale of 1 to 100, for example. Accents, speaking skills, and perceived personality are readily detected by a reviewing agent trained to screen such candidates based on how they sound. After listening to each wave file, a subjective score (between 1 and 100) is entered into the applicant's audio-web profile for future processing. In the example of FIG. 7, subjective scores are shown to be 100, 80, and 80, respectively, for each of three evaluated items.

For questions that require correct answers (as opposed to repeating phrases or reading text), a confidence score can serve multiple purposes, for example, a likelihood of correctness and a likelihood of correct pronunciation. For such questions, high scores are only possible when the correct answer is given and the pronunciation matches the recognizer's expected pronunciation rules, which are represented in a voice-recognition lexicon that can be optimized for specific desired pronunciations.

For most audio wave files that are recorded by the application, meaningful automated scoring is achieved by applying confidence scoring, which is important to the invention and is described, for example, in "Recognition Confidence Scoring for Use in Speech Understanding Systems" Hazen et al. 2000 (http://citeseer.ist.psu.edu/hazen00recognition.html), which is hereby incorporated herein by reference in its entirety. In fact, a completely automated screening process can be used to filter out a high percentage of applicants without human intervention. A standard of acceptance can be adjustable. Performance criteria can be completely objective. For example, just by looking at the queue of applicants, the aggregate confidence score (without human intervention) can be displayed and the applicants can be rank-ordered automatically before any human analysis of the applicant's audio data is performed. Perhaps only the top 25% of the applicants that complete the screening application will be considered for further evaluation by human intervention in one exemplary screening method.

There are several types of applicant-related tasks that can be automatically scored by applying confidence measures, including, for example:
1) repeating phrases through prompting.
2) speaking (or reading out loud) displayed text.
3) speaking answers to prompted questions; and
4) speaking answers related to image information.

It is noted that several types of cognitive processing are required to complete all of the applicant tasks successfully. These include, but are not limited to, reading, listening, speaking, knowledge of a language, analyzing images, understanding instructions, being creative, manual dexterity, and possessing relevant knowledge to answer questions. It is through the combination of applying various skills that high-confidence scoring is achieved. With appropriate pre-preparation, the process according to the present invention is capable of simulating an actual working environment. In fact, an applicant may be qualified to be a virtual agent (qualified to work remotely) by scoring high enough from "his or her" calling environment, which must include appropriate telephone and web access.

Various servers 4, 9, 13 are mentioned herein. Mentioning them separately is not a requirement to being physically separated servers. Accordingly, a single physical server can host the functions described herein as servers 4, 9, 13.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

We claim:

1. A method for screening applicants by a screening entity, which comprises:
   remotely accessing a screening entity's pre-screening online web page by a potential candidate using an Internet-accessible computer available to the candidate;
   using the pre-screening web page, requesting the candidate to input responses to a set of queries into the computer that are tailored to the screening entity;
   storing the candidate's responses to the queries in a profile;
   at least during the response requesting step, automatically initiating a phone call to the candidate over a telephone on a telephone network in response to at least one of the candidate's responses;
   and
   commencing an interactive information gathering process with the candidate using both the telephone and the computer by:
   generating prompts to the candidate via the telephone and the web page; and recording the candidate's verbal responses to the telephone and web page prompts via the telephone;
   storing a profile of the candidate in a database including the verbal responses from the candidate for later access and analysis in a skill assessment of the candidate by the screening entity; and
   analyzing the recorded responses by the screening entity to make quality and criteria judgments about the candidate to determine the hiring potential of the candidate, the analyzing step comprising automatically determining a confidence scoring of the candidate with a computerized speech recognition device by automation.

2. The method according to claim 1, which further comprises:
   hosting the web page with an external server; and
   accessing an internal server that hosts an internal web page of the screening entity.

3. The method according to claim 1, which further comprises one of:
   carrying out the phone call initiating step by simultaneously initiating the phone call to the candidate; and
   carrying out the phone call initiating step by initiating the phone call to the candidate after the candidate has completed responding to the queries.

4. The method according to claim 1, which further comprises initiating the phone call to the candidate with a voice server through a private branch exchange over the telephone network.

5. The method according to claim 1, which further comprises confirming the candidate's identity through a set of identification questions and responses via one of the telephone and the pre-screening web page.

6. The method according to claim 1, which further comprises carrying out the profile storing step by storing the profile of the candidate one of:
   during the information gathering process; and
   after the information gathering process is complete.

7. The method according to claim 1, which further comprises carrying out the profile storing step by storing the profile of the candidate through an entity-secure intranet link.

8. The method according to claim 1, which further comprises carrying out the phone call initiating step by initiating the phone call only with outbound calls from the screening entity to, thereby, control access to the information gathering process.

9. The method according to claim 1, which further comprises carrying out the information gathering step by controlling a number and kind of questions presented to the candidate to simulate a real call-center seat.

10. The method according to claim 1, which further comprises carrying out the storing step one of selectively and continually.

11. The method according to claim 1, wherein the computerized speech recognition device is programmed to parse a particular response into individual words and to either compare the parsed response to a desired responses or to transcribe the parsed response for later use and access by the screening entity.

12. The method according to claim 11, which further comprises carrying out the automated confidence scoring step by judging at least an accuracy and an intelligibility of the candidate's speech utilizing a target phrase represented in a speech recognition grammar.

13. A method for screening candidates by a screening entity, which comprises:
   initiating a job application procedure by having a candidate remotely connect to a secured online web page of a screening entity using an Internet-accessible computer;
   using the secured online web page, querying the candidate to enter candidate-specific personal identification data using the computer;
   securely confirming the identification data; and
   initiating a phone call to candidate after the identification data is confirmed and while the candidate is still communicating with the web page and, during the phone call, carrying out at least one of the following exercise steps:

initiating a dictation clarity exercise by instructing candidate to read a script sent to a particular web page viewable by the candidate on the computer and, when finished, recording speech from the candidate for subsequent off-line analysis and applying a confidence scoring to the recorded speech; and initiating a graphic comprehension exercise to screen the candidate's ability to respond to a provided graphic by displaying a graphic to the candidate on the computer, requiring the candidate to answer questions regarding the graphic, recording the spoken answers over the telephone, and automatically scoring each answer with a confidence level correlated with how well the recorded phrase matches the expected pronunciation;

after a given number of exercises are complete, storing data recorded for later analysis in a skill assessment of the candidate by the screening entity and informing the candidate that an application process is complete; and analyzing the recorded responses by the screening entity to make quality and criteria judgments about the candidate to determine the hiring potential of the candidate, the analyzing step comprising automatically determining a confidence scoring of the candidate with a computerized speech recognition device by automation.

14. The method according to claim 13, which further comprises securely confirming the identification data.

15. The method according to claim 13, which further comprises carrying out the secure confirming step by one of directly with the candidate and indirectly through an email sent to the candidate's email address that requires a response from the candidate.

16. The method according to claim 13, which further comprises carrying out the phone call initiating step with a voice server immediately after the identification data is confirmed.

17. The method according to claim 13, which further comprises carrying out at least one of the following exercise steps:

initiating a voice quality exercise over the telephone by asking the candidate to repeat spoken phrases over the telephone, recording the candidate's speech for each phrase for subsequent off-line analysis, and automatically scoring each recorded phrase with a confidence level correlated with how well the recorded phrase matches an expected pronunciation;

initiating a question-answer exercise by transmitting specific multiple-choice questions over the telephone, prompting the candidate to answer each question after it is presented, recording the candidate's speech for each answer, and automatically scoring each recorded answer with a confidence level correlated to how well the recorded phrase matches an expected pronunciation;

initiating a service knowledge exercise to determine the candidate's ability to comprehend an example of what good customer service is and whether the candidate can intelligently describe such an experience by having the candidate give a speech regarding such an experience, recording the speech for subsequent off-line analysis, and applying a subjective confidence scoring to the recorded speech; and initiating a speaking satisfaction exercise with the candidate to evaluate the kind of experience that a potential customer will have after speaking to the candidate by giving the candidate a random one of a series of predefined situations in which candidate is required to role-play an operator answering in real-time a call from a virtual customer, recording the conversation between the candidate and the virtual customer for subsequent off-line analysis, and applying a subjective confidence scoring to the recorded conversation.

18. The method according to claim 13, which further comprises carrying out the voice quality initiating exercise step by storing the candidate's speech for each phrase for off-line analysis.

19. The method according to claim 13, which further comprises carrying out the dictation clarity exercise step by storing speech from the candidate for subsequent off-line analysis.

20. The method according to claim 13, which further comprises carrying out the confidence scoring step at least one of automatically and with human judgment.

21. The method according to claim 13, which further comprises carrying out the question-answer exercise step by storing the candidate's speech for each question for subsequent off-line analysis.

22. The method according to claim 13, which further comprises carrying out the question-answer exercise step by transmitting the multiple-choice questions by at least one of a human voice and a machine voice.

23. The method according to claim 13, which further comprises carrying out the service knowledge exercise step by storing the speech for subsequent off-line analysis.

24. The method according to claim 13, which further comprises carrying out the graphic comprehension exercise step by storing the spoken answers for subsequent off-line analysis.

25. The method according to claim 13, which further comprises carrying out the graphic comprehension exercise step by providing a map as the graphic and screening the candidate's ability to give driving directions.

26. The method according to claim 13, which further comprises carrying out the speaking satisfaction exercise step by storing the conversation for subsequent off-line analysis.

27. The method according to claim 13, which further comprises providing the candidate with a timeframe for hearing from the screening entity or given a call number and a date for checking on the candidate's application.

28. The method according to claim 13, which further comprises providing the candidate with a call number and a date for checking on a status of the application.

* * * * *